(Model.) 2 Sheets—Sheet 1.

G. H. NEWELL.
PERMUTATION PADLOCK.

No. 287,309. Patented Oct. 23, 1883.

Witnesses:
E. M. Johnson
H. H. Taylor

Inventor.
George H. Newell

Attorney (Model.)
2 Sheets—Sheet 2.
G. H. NEWELL.
PERMUTATION PADLOCK.
No. 287,309. Patented Oct. 23, 1883.
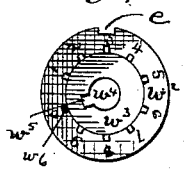
Fig. 7.
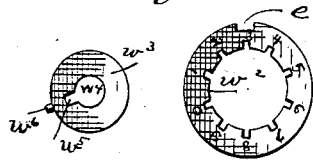
Fig. 8.
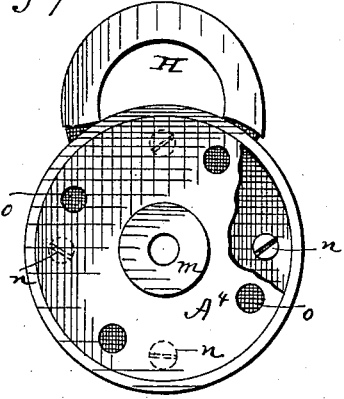
Fig. 9.
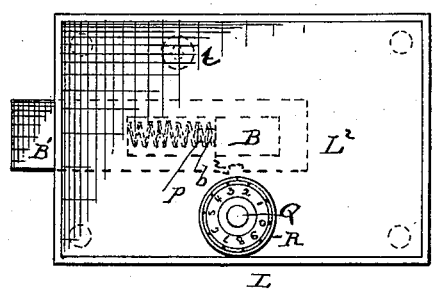
Fig. 10.
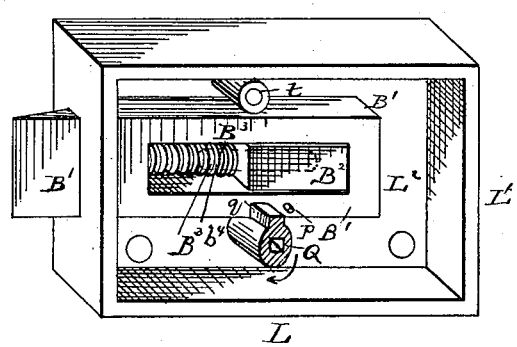
Fig. 11
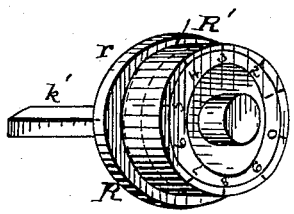
Witnesses:
E. M. Johnson
H. H. Taylor
Inventor
George H. Newell
Attorney.

UNITED STATES PATENT OFFICE.

GEORGE H. NEWELL, OF WOODSVILLE, NEW HAMPSHIRE.

PERMUTATION-PADLOCK.

SPECIFICATION forming part of Letters Patent No. 287,309, dated October 23, 1883.

Application filed March 1, 1883. (Model.)

*To all whom it may concern:*

Be it known that I, GEORGE H. NEWELL, a citizen of the United States of America, residing at Woodsville, in the county of Grafton and State of New Hampshire, have invented certain new and useful Improvements in Combination-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of locks in which, in order to retract the bolt, notched tumbler-wheels must be arranged in proper order, according to a predetermined combination, in order to bring the notches of said tumbler-wheels in line to receive the dog of a tumbler which controls the bolt.

The object of my improvement is to provide a lock of this class which shall be simple in construction and operation, its interior inaccessible when locked, and the combination of which cannot be discovered by unauthorized persons.

The invention consists in certain novel constructions and combinations of devices, which will be hereinafter particularly described, and pointed out in the claims.

Figure 1:
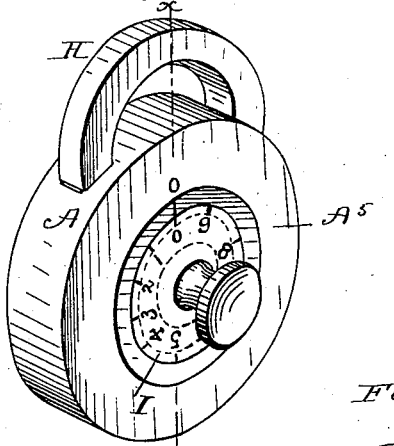
Figure 2:
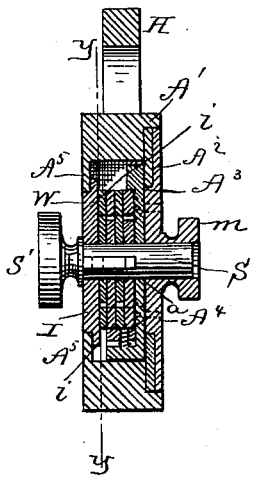
Figure 3:
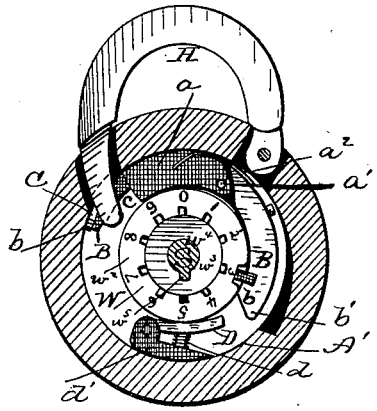
Figure 4:
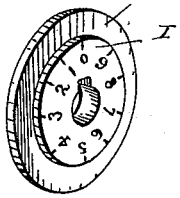
Figure 5:
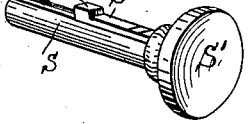
Figure 6:
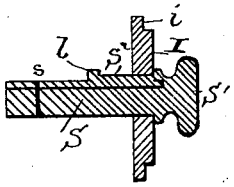

In the accompanying drawings, Figure 1 is a front perspective view of the padlock constructed according to my invention. Fig. 2 is a diametrical section of the same on the line $x$ $x$, Fig. 1. Fig. 3 is a section of the lock on the line $y$ $y$, Fig. 2. Fig. 4 is a perspective view of the front indicator-plate. Fig. 5 is a perspective view of the spindle and front knob. Fig. 6 is a longitudinal section of the spindles with the indicator-plate in diametric sections. Fig. 7 is a view of one of the tumbler-wheels complete. Fig. 8 is a view of the same and its interior setting-disk removed. Fig. 9 is a rear view of the lock, illustrating the means for preventing access to the interior thereof when locked. Fig. 10 is a front view of a spring door-latch with my improved combination attachment applied thereto. Fig. 11 is a perspective view of the latch and combination-casing separated.

The letter A indicates the padlock-casing, having an inwardly-projecting flange, A', to which is secured the annular back plate, $A^2$, which fits around a boss, $A^3$, projecting inwardly from the movable guard-disk $A^4$, the outer edge of which fits within the peripheral rim of the lock-case. This boss has a central spindle-opening, $a$. At one side of this opening $a$ is a lug, $a'$, to which is attached by means of a connecting-spring, $a^2$, a curved tumbler, B, from the inner edge of which, near its free end, projects a dog, $b$. The tendency of the spring $a^2$ is to force the free end of the tumbler B and its dog inwardly. From the opposite end of the lug $a'$ projects a locking-bolt, C, and on the opposite side of the boss from this lug is pivoted a segmental plate, D, which is forced inward by spring $d$, placed between it and an abutment, $d'$, on the margin of the boss. It will be observed that the inner edges of the lug $a'$, tumbler B, and plate D partially surround a circular space, and within this space are arranged the tumbler-wheels W, each of which is composed of a ring, $w^2$, and a removable and adjustable inner setting-disk, $w^3$. The ring $w^2$ has in its inner edge a series of equidistant notches numbered from 1 to 0 consecutively, and in its outer edge a dog-receiving notch, $e$, this dog-receiving notch being opposite the notch of the same number in all the rings of the tumbler-wheels in a lock—in the present instance opposite the notch No. 3. The setting-disk $w^3$ has central spindle-openings, $w^4$, from which is cut a notch, $w^5$, and from the periphery of each disk projects a pin, $w^6$, directly opposite the notch $w^5$, and of such size as to fit snugly within either of the numbered notches of the ring $w^2$.

The letter $A^5$ designates the front plate of the lock, which is provided with a circular central opening to receive the indicator-plate I, which has a central notched spindle-opening similar to those of the tumbler-wheel. The front face of the indicator-plate I is preferably flush with the face of the front plate of the lock, and from its rear edge extends a flange, $i$, which extends behind the front plate and prevents the outward removal of the indicator-plate.

The letter S indicates the operating-spindle, provided with a knob, S', and a removable spline or rib, $S^2$, which is dovetailed into the spindle and held by a screw, $s$. From the inner end of this spline or rib projects a lug, $l$, and this lug is of such length that when the spindle is drawn outward it will catch behind the indicator-plate, although the spline $S^2$ slides through the notch of the spindle-opening in said plate. It should be noticed, however, that the notches $w^5$ in the setting-disk of the tumbler-wheel are sufficiently deep to permit this lug $l$ to pass through them. The movable guard-plate $A^4$ has a central outwardly-projecting boss, $m$, through which is formed an opening to receive the rear end of the spindle. This spindle slides longitudinally, and when in its inner position, with the knob S snug against the indicator-plate, the spline $S^2$ will be in the notches $w^5$ of all the tumbler-wheels, and will carry said wheels around with it when it is turned. These tumbler-wheels are arranged within the space which is partially surrounded by the segmental lug $a'$, tumbler B, and segmental plate D, and this segmental plate D is pressed against the peripheries of the tumbler-wheels by the spring $d$, which forces them against the inner curved edge of the lug $a'$ and holds them stationary, except when they are moved by the spindle. As before stated, the spindle may be drawn outwardly until the lug $l$ abuts against the indicator-plate I, at which time said lug will stand within the notch $w^5$ of the tumbler-wheel W, which comes next behind the indicator-plate, and all the rest of the tumbler-wheels will be released from the spindle and held from turning by the spring-plate D. The spline $S^2$ is graduated or marked on its outer edge at intervals corresponding to the thickness of the tumbler-wheels. When the spindle is drawn out so that the first of these marks or graduations is even with the front face of the indicator-plate, the rearmost of the tumbler-wheels will be released from the spline $S^2$, and will be held stationary when the spindle is turned, though all of the other tumbler-wheels will be carried around with the spindle, and so, when the spindle is drawn out to the second graduation, the next to the rearmost tumbler-wheel will be released, and so on, the tumbler-wheels being released successively as the spindle is drawn out to successive graduation; but the foremost tumbler-wheel is never released. The indicator-plate has its margin graduated and numbered at intervals corresponding to the numbered notches of the tumbler-wheels, its zero-mark being opposite the notch in which plays the spline $S^2$ of the spindle.

In setting the lock for a given combination the setting-plate of the first or front tumbler-wheel is placed within its ring $w^2$, with its pin $w^6$ in a notch of said ring having the last number or figure of the combination, and the wheel is then placed upon the spindle directly behind the indicator-plate, with the spline of the spindle in its notch $w^5$. This brings the last figure or number of the combination in line on the spindle with the zero-mark of the indicator-plate. The other tumbler-wheels are similarly arranged to bring the other figures or numbers of the combination successively in line on the spindle. The wheels being thus arranged, their dog-receiving notches $e$ will obviously not be in line, as they are in coincidence with the same number on all the tumbler-wheels, but must be brought in line before the dog $b$ can enter them, said dog being of such length that it extends across the peripheries of all the wheels, and therefore cannot enter the notch of any wheel until all the notches are in line and it enters them all at once. When the dog enters the notches and the spindle is turned to the right, as indicated by the arrow, the tumbler-wheels will be turned, and, acting on the dog $b$ and tumbler B, the boss $A^3$, with which said tumbler is connected, will be similarly turned and withdraw the bolt C from the position in which it engages the hasp H, which is thus unlocked. Supposing, now, that the lock has been set for a given combination—say, for instance, 7 0 5 4—the manner of unlocking is as follows: The spindle, being at its inner position, is turned to bring the first figure of the combination (7) opposite the zero-mark on the front plate of the lock. This brings the dog-receiving notch $e$ of the rearmost tumbler-wheel directly opposite the dog $b$ of the tumbler B. The spindle is then drawn outward to the first mark on the spline $S^2$, thus withdrawing the spline from the notch of said rearmost tumbler-wheel, so that it will be left standing when the spindle is again turned to bring the next figure of the combination opposite the zero-mark on the front plate. As each wheel is thus placed with its notch in line, the spindle is drawn outward one graduation, releasing said wheel successively toward the front; but when the notch of the front wheel is finally brought into line, the dog drops into all the notches, and the spindle then being turned to the right, the front tumbler-wheel drags the dog, tumbler B, and boss $A^3$, thus moving the lug $a'$ and the bolt C, to disengage the latter from the hasp. It is thus unlocked and may be turned back. The bolt is of such shape that when it is engaged with the hasp its shoulder $c$ prevents its moving beyond the hasp, and the corner $b'$ of the tumbler enters a notch in the flange $A'$, so that it will be impossible for the bolt to be withdrawn or the boss $A^3$ turned until the tumbler moves inward on the proper setting of the wheels. In locking the bolt the spindle is turned to the left to bring it to the proper position, where it stops, and the spindle being further rotated, the dog is thrown up out of the notches, and said notches will become disarranged or thrown out of line by a slight further turning of the wheels.

It will be remembered that the boss $A^3$ turns within the annular back plate, $A^2$, which is attached to the flange $A'$, and said boss carries with it the movable guard-plate $A^4$. The annular back plate, $A^2$, is attached to the flange $A'$ by means of screws $n$, and the movable guard-plate is provided with openings $o$, through which a screw-driver may be inserted to turn these screws when the boss has been turned to retract the bolt; but when the boss is turned to bring the bolt into engagement with the hasp or to its locking position, the holes $o$ of the guard-plate are thrown out of line with the screw-heads, which are then covered by the guard-plate and are inaccessible. These screws are the only means of opening the lock-case, the front plate of said case being made in one piece with its peripheral rim, so that when the lock is locked there is no means of opening it except by using the proper combination.

In Figs. 10 and 11 I have illustrated the manner of applying my improved combination-casing to an ordinary spring door-latch, Fig. 10 representing the latch with the combination-casing applied thereto.

The letter L in Fig. 11 represents the latch with its front plate removed, and inside the casing L' is a slotted bolt, B', supported by a lug, $B^2$, which projects into its slot from the back plate. The front wall of the slot has a pin, $B^3$, projecting rearwardly from it and entering a passage in the lug $B^2$. Around this pin $B^3$ is a spring, $b^4$, bearing against the lug and the front wall of the slot, respectively, and tending to keep the latch-bolt B' normally projected. From the front side of said bolt projects a pin, $p$, and under said bolt, in suitable bearings, is arranged an operating-spindle, Q, having a squared central opening. From the upper side of said spindle projects a lug, $q$, which is intended to strike the pin $p$ and retract the bolt when the spindle is turned to the right, or in the direction indicated by the arrow.

The letter R in Fig. 11 designates the modified form of the combination-casing, the rim R' corresponding to the peripheral rim of the padlock-casing, and in this instance this peripheral rim has a projecting flange, $r$, which is to take behind the front plate, $L^2$, of the latch-case through a circular opening, in which the rim R' projects. The arrangement of parts within this rim is precisely the same as in the padlock, except that there is no occasion for the bolt C, as there is no hasp connected with the casing and no openings in the rim R'. The back knob, $k$, is prolonged to form a squared spindle, $k'$, which enters the squared passage of the spindle Q. It will be remembered that this back knob, $k$, is attached to the movable guard-plate $A^4$, and that this guard-plate can only be turned by the spindle and knob S when the combination is properly set; and it will be understood, therefore, that the spindle $k'$ can only be turned to operate the bolt B' through the spindle Q when the proper combination is used. The front plate, $L^2$, is attached to the latch-case by means of pipe $t$ and screws in the usual manner.

It will be readily understood that my improved combination-casing may be applied to various kinds of locks by making the proper connection between the guard-plate $A^4$ and a suitable operating-spindle of such locks.

Having now fully described my invention, I wish it to be understood that I do not confine myself to the precise details of construction as shown in my drawings, but may vary the same in any manner for the better carrying out of the essential principles of my invention without departing from the true spirit and scope thereof.

What I claim is—

1. In a combination-lock, the combination, with the casing and its annular back plate, $A^2$, secured to the casing by screws, of the movable guard-plate $A^4$, provided with apertures adapted to be brought in coincidence with said screws, and the combination mechanism connected with said guard-plate and arranged to move and hold said guard-plate with its apertures out of line with said screws, substantially as described.

2. The combination, with the casing made in two parts, capable of rotation with respect to each other, tumbler, segmental lug $a'$, rigidly attached to the casing, and movable tumbler-wheels, of the spring-plate D, bearing upon the peripheries of said wheels, substantially as described, and for the purpose set forth.

In testimony whereof I affix my signature in presence of two witnesses.

GEORGE H. NEWELL.

Witnesses:
E. WOODS,
L. B. ALDRICH.